(12) United States Patent
Preston, III

(10) Patent No.: US 9,255,548 B2
(45) Date of Patent: Feb. 9, 2016

(54) SLIDING U-JOINT HANGER FOR GAS TURBINE ENGINE NOZZLE

(75) Inventor: Lon H. Preston, III, Hobe Sound, FL (US)

(73) Assignee: United Technologies Corporation, Hartford, CT (US)

( * ) Notice: Subject to any disclaimer, the term of this patent is extended or adjusted under 35 U.S.C. 154(b) by 596 days.

(21) Appl. No.: 13/609,907

(22) Filed: Sep. 11, 2012

(65) Prior Publication Data

US 2014/0069106 A1   Mar. 13, 2014

(51) Int. Cl.
*F02K 1/82* (2006.01)
*F02K 1/80* (2006.01)
*F23R 3/60* (2006.01)
*F02C 7/20* (2006.01)

(52) U.S. Cl.
CPC . *F02K 1/822* (2013.01); *F02K 1/80* (2013.01); *F02K 1/82* (2013.01); *F02C 7/20* (2013.01); *F05D 2230/642* (2013.01); *F05D 2240/90* (2013.01); *F05D 2260/31* (2013.01); *F23R 3/60* (2013.01); *Y02T 50/675* (2013.01); *Y10T 29/49231* (2015.01)

(58) Field of Classification Search
CPC ............ F02K 1/80; F02K 1/82; F02K 1/822; F02C 7/20; F23R 3/60; F05D 2240/90
See application file for complete search history.

(56) References Cited

U.S. PATENT DOCUMENTS

| | | | |
|---|---|---|---|
| 2,557,304 A * | 6/1951 | McLeod | 285/224 |
| 5,215,256 A * | 6/1993 | Barcza | F02K 1/008 |
| | | | 239/265.39 |
| 7,581,399 B2 | 9/2009 | Farah et al. | |
| 7,866,158 B2 | 1/2011 | Murphy | |
| 7,975,488 B2 | 7/2011 | Farah et al. | |
| 2007/0003411 A1 | 1/2007 | Manzoori | |
| 2007/0151229 A1* | 7/2007 | Farah et al. | 60/232 |
| 2007/0158527 A1 | 7/2007 | Farah et al. | |
| 2008/0022689 A1* | 1/2008 | Farah et al. | 60/770 |
| 2009/0077978 A1 | 3/2009 | Figueroa et al. | |
| 2009/0293498 A1 | 12/2009 | Petty et al. | |

* cited by examiner

*Primary Examiner* — Gerald L Sung
*Assistant Examiner* — Scott Walthour
(74) *Attorney, Agent, or Firm* — Carlson, Gaskey & Olds, P.C.

(57) ABSTRACT

A disclosed hanger assembly for supporting a liner within a gas turbine engine exhaust nozzle includes a first mount for attachment to a case and a second mount for attachment to the liner. A u-joint assembly is attached between the first and second mounts and includes a first yoke and a second yoke aligned transverse to the first yoke. A pivot block is includes a first set of pins received by the first yoke and a second set of pins received by the second yoke. The u-joint assembly accommodates relative movement between the liner and case.

13 Claims, 6 Drawing Sheets

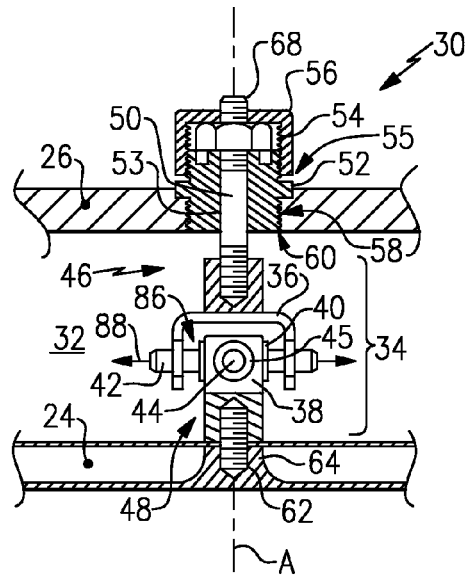
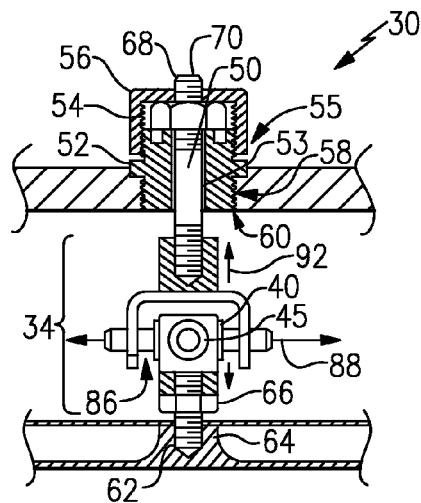
FIG.2  FIG.3
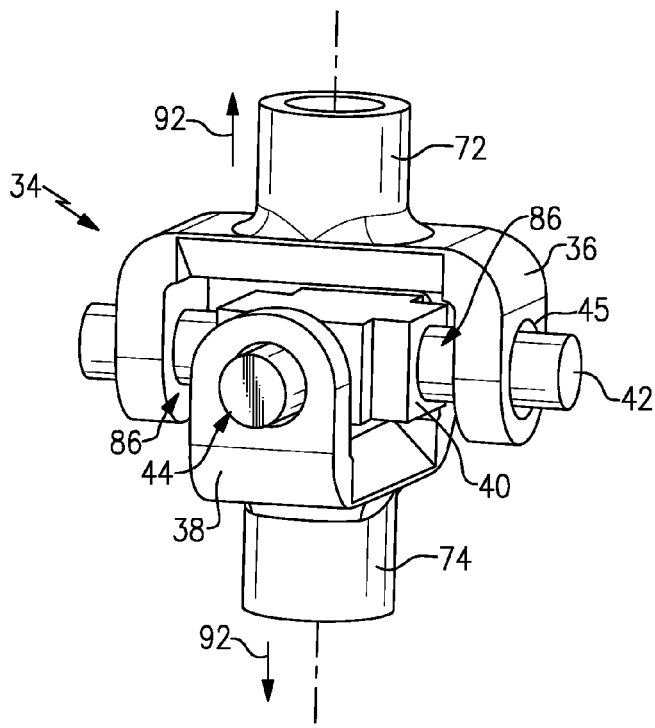
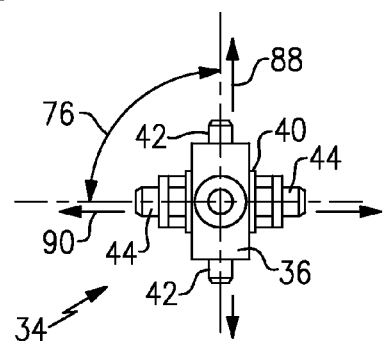
FIG.4  FIG.5

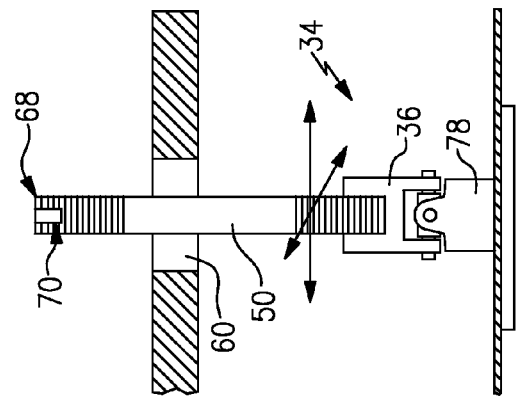
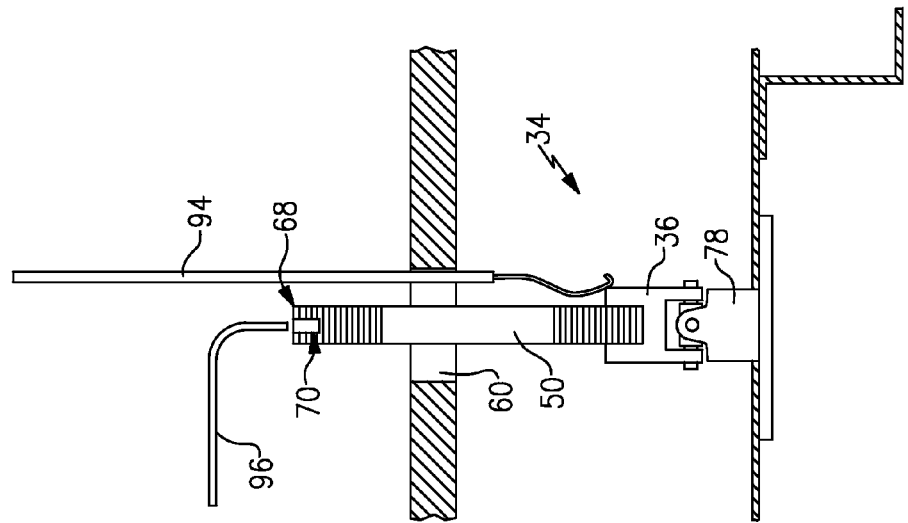
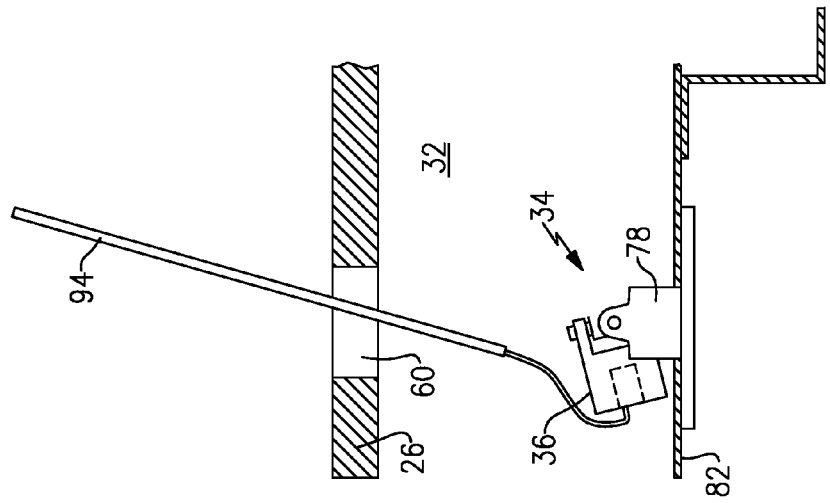

US 9,255,548 B2

SLIDING U-JOINT HANGER FOR GAS TURBINE ENGINE NOZZLE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engine exhaust systems include heat shield liners that are suspended from a structural case by hangers. The hangers support the heat shield relative to the case and compensate for relative motion between the two parts. Typical hangers require some level of custom rigging and assembly and therefore complicate assembly. Accordingly, it is desirable to design and develop hanger assemblies that reduce complexity, provide adjustability to accommodate tolerances and standardize assembly.

SUMMARY

A hanger assembly for a gas turbine engine nozzle liner according to an exemplary embodiment of this disclosure, among other possible things includes a first mount for attachment to a case, a second mount for attachment to a liner, a first yoke attached to the first mount, a second yoke attached to the second mount and aligned transverse to the first yoke, and a pivot block including a first set of pins received by the first yoke and a second set of pins received by the second yoke.

In a further embodiment of the foregoing hanger assembly, the first set of pins is disposed transverse to the second set of pins.

In a further embodiment of any of the foregoing hanger assemblies, each of the first yoke and the second yoke includes openings receiving corresponding ends of the first set of pins and the second set of pins.

In a further embodiment of any of the foregoing hanger assemblies, the first yoke is movable in three planes relative to the second yoke.

In a further embodiment of any of the foregoing hanger assemblies, the first mount includes a bushing received within an opening of the case and a first threaded member extending through the bushing that is attached to the first yoke.

In a further embodiment of any of the foregoing hanger assemblies, a nut is attached to the first threaded member and a cap is attached to the bushing over the nut.

In a further embodiment of any of the foregoing hanger assemblies, the second mount includes a threaded member attached to the second yoke and to the liner.

An exhaust nozzle assembly according to an exemplary embodiment of this disclosure, among other possible things includes an exhaust case defining an interior space. A liner is spaced apart from the exhaust case within the interior space defining a passage for exhaust gases. A plurality of hangers supports the liner relative to the exhaust case. Each of the plurality of hangers includes a first mount attached to the case, a second mount attached to the liner, and a pivot block movably supported between a first yoke attached to the first mount and a second yoke attached to the second mount.

In a further embodiment of the foregoing exhaust nozzle assembly, the pivot block includes a first set of pins received within the first yoke and a second set of pins received within the second yoke transverse to the first set of pins.

In a further embodiment of any of the foregoing exhaust nozzle assemblies, each of the first yoke and the second yoke include openings corresponding ones of the first set of pins and the second set of pins with the openings defining a clearance fit between the first and second sets of pins.

In a further embodiment of any of the foregoing exhaust nozzle assemblies, the first mount includes a bushing received within the case. The bushing defines a clearance opening for a first threaded member attached to the first yoke and a nut attached to an end of the first threaded member.

In a further embodiment of any of the foregoing exhaust nozzle assemblies, a cap is attached to the bushing and covers the nut and the threaded member constrains movement of the first threaded member through the bushing.

In a further embodiment of any of the foregoing exhaust nozzle assemblies, the second mount comprises a second threaded member attached to the liner.

In a further embodiment of any of the foregoing exhaust nozzle assemblies, the second yoke comprises the second mount and is attached to the liner.

A method of assembly of an exhaust nozzle assembly according to an exemplary embodiment of this disclosure, among other possible things includes attaching a liner mount to an outer surface of a liner. The liner mount includes a pivot block supported between a first yoke and a second yoke, positioning the liner within an interior surface of an exhaust case such that the liner mount is aligned with an opening through the exhaust case, attaching a first threaded member to a the liner mount through the opening in the exhaust case, installing a bushing within the opening in the exhaust case and around the first threaded member, installing a nut onto the first threaded member, and installing a cap over the nut and first threaded member.

In a further embodiment of the foregoing method, the cap is attached to the bushing.

In a further embodiment of any of the foregoing methods, a spacing is set between the liner and the exhaust case with the first threaded member.

In a further embodiment of any of the foregoing methods, the liner mount is positioned with a tool inserted through the opening in the exhaust case to receive the first threaded member.

In a further embodiment of any of the foregoing methods, the first threaded member is aligned within the opening with the bushing.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a schematic view of an example hanger assembly.

FIG. 3 is a schematic view of another hanger assembly.

FIG. 4 is a perspective view of u-joint portion of the example hanger assembly.

FIG. 5 is a top view of the example u-joint assembly.

FIGS. 7A-7H are schematic views of an example assembly method.

DETAILED DESCRIPTION

Figure 1:
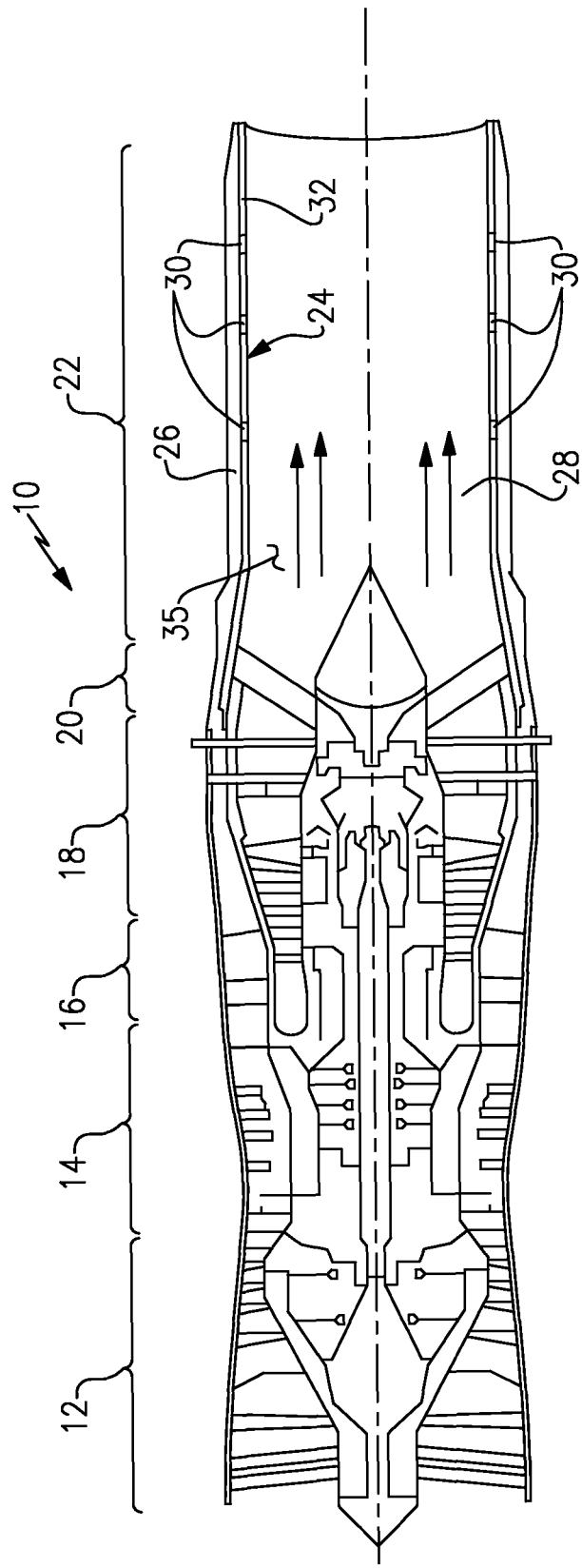
FIG. 1 is a schematic view of an example gas turbine engine.

Referring to FIG. 1, a gas turbine engine 10 includes a fan section 12, a compressor section 14, a combustor section 16, and a turbine section 18. Air entering into the fan section 12 is initially compressed and fed to the compressor section 14. In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gases 28 and ignited to generate additional thrust. The exhaust gases 28 flow from the turbine section 18 and the augmenter section 20 through an exhaust liner assembly 22.

The example exhaust liner assembly 22 includes an outer case 26 and an inner liner 24 that defines an inner space of an exhaust passage 35. A plurality of hangers 30 are disposed between the case 26 and the liner 24 to hold the liner 24 in a spaced apart orientation relative to an interior surface of the case 26. The liner 24 could be a single unitary part, or a plurality of individual parts attached within the case 26.

Referring to FIG. 2, the disclosed example liner 24 comprises an iso-grid having a plurality of bosses 64 spaced apart from each other within the framework of the liner 24. The example hanger 30 includes a u-joint assembly 34 that is supported by way of a first mount 46 secured to the case 26 and a second mount 48 secured to the liner 24. The u-joint 34 includes a first yoke 36 attached to the mount 46 and a second yoke 38 attached to the second mount 48. A pivot block 40 is disposed between the first yoke 36 and second yoke 38 and includes a first set of pins 42 and a second set of pins 44. The first set of pins are received within openings 45 of the first yoke 36 and second set of pins 44 are received within openings 45 of the second yoke 38.

The openings 45 are larger than the first and second sets of pins 42 and 44 to allow sliding and/or rotational movement of the pivot block 40 and thereby the first yoke 36 relative to the second yoke 38. The example hanger assembly 30 illustrated in FIG. 2 is secured by way of a threaded member or stud 62 that is secured within the boss 64 of the liner 24.

Referring to FIGS. 4 and 5 with continued reference to FIG. 2, the example u-joint assembly 34 includes the yokes 38 and 36. The first yoke 36 includes a boss 72 that receives a portion of a threaded member 50 that extends through the case 26. The second yoke 38 includes the boss 74 that receives the threaded member 62 that is secured within the boss 64 of the liner 24. In this example, the hanger 30 is secured to the liner 24 by way of the threaded stud 62 inserted into the boss 64 such that an orientation of pivot axes defined by each of the first and second sets of pins 42 and 44 are not orientated in any specific direction. That is, the orientation of the hanger 30 is set by the tightening of the boss 74 onto the stud 62 and is not aligned in any specific direction common to other hanger assemblies.

Referring to FIG. 3, another hanger assembly 30 includes the boss 64 and stud 62 that are inserted within the liner 24. In this example, a lock nut 66 is disposed on the stud 62 such that the hanger assembly can be aligned and provided with a specific desired orientation relative to other hanger assemblies between the case 26 and liner 24. Once the orientation of the hanger assembly 30 illustrated in FIG. 3 is set, then the lock nut 66 can be tightened down against the boss 74 to maintain a specific orientation of the u-joint assembly 34.

Referring to FIGS. 2 and 3, the first mount 46 that secures the u-joint assembly 34 to the case 26 includes the threaded member 50 that extends through an opening 60 defined within the case 26. A bushing 52 is also disposed within the opening 60. The bushing 52 includes threads 58 that engage corresponding threads within the case 26. Bushing 52 includes a tool interface that permits the application of torque when threads 58 are engaged. The torque interface may take the form of holes for a standard spanner wrench, as shown in FIG. 2 on the portion of bushing 52 protruding above case 26. Alternately, a hex interface (not shown) can be integrated into the seating flange at the middle of bushing 52 to provide a wrench interface. The bushing 52 also includes a bore 53 through which the threaded member 50 extends. The bore 53 is not threaded such that the threaded member 50 may freely move within the bore 53.

The threaded member 50 extends upwards through the bushing 52 and is secured against the bushing by locknut 54. The locknut 54 is seated against the bushing 52 during assembly to accommodate assembly tolerances. As appreciated, because the bore 53 of the bushing 52 is not threaded, the threaded member 50 is not restricted from movement out of the case 26 and through the bushing 52. A cap 56 attached to the bushing 52 over the nut 54 and an end of the threaded member 50 prevents movement of the hanger assembly 30 relative to the case 26 along axis A.

The cap 56 is threaded on a larger internal diameter and is screwed onto the bushing 52. The bushing 52 includes external threads that mate to the internal threads of the cap 56. The cap 56 includes an opening that provides clearance for the threaded member 50 to extend upward beyond the cap 56. The upward extension of the threaded member 50 accommodates tolerances that may cause variation in the distance that the threaded member 50 extends past the cap 56. The locknut 54 seats against a top surface of the bushing 52 to provide the desired air seal. Accordingly, the opening in the cap 56 does not generate a leakage path.

The cap 56 includes a vertical length smaller than the vertical length of the bushing 52 and locknut 54 combined. The difference in lengths provides that a gap 55 is always provided between a bottom surface of the cap 56 and the bushing 52 and/or the case 26. Because the gap 55 is always provided, the cap 56 will always seat against the locknut 54 and not bottom out against the bushing 52 and/or case 26. The cap 56 therefore provides for the securement of the locknut 54 and prevents vertical movement of the hanger assembly 30.

Accordingly, the hanger assembly 30 limits movement of the u-joint assembly 34 that is disposed within the space 32. The first mount 46 and the second mount 48 maintain a rigid orientation of the u-joint assembly 34 within the space 32.

Referring to FIGS. 4 and 5 with continued reference to FIGS. 2 and 3, the u-joint assembly 34 provides for the accommodation of sliding and/or rotational movement along the axis A as is indicated by arrows 92 and also in a direction along the axes 90 and 88 (FIG. 5). The first pin set 42 is disposed transversely at a 90° angle indicated at 76 from the second pin set 44. The relative orientation between the first and second pin sets 42, 44 allow movement in each of the respective axes 92, 88 that are defined by the corresponding first and second sets of pins 42, 44.

The example pin block 40 includes the first and second pins 42 and 44 that are pressed within the central block portion to extend outward a distance such that they may extend through the opening 45 defined within the corresponding first and second yokes 36, 38. The pin block 40 includes a width that is smaller than the corresponding first and second yokes 36 and 38 to define a gap 86 between the inner portions of the yokes 36 and 38 and the pin block 40. This gap 86 provides for the relative movement along the respective axes of each of the first and second yokes.

Figure 6:
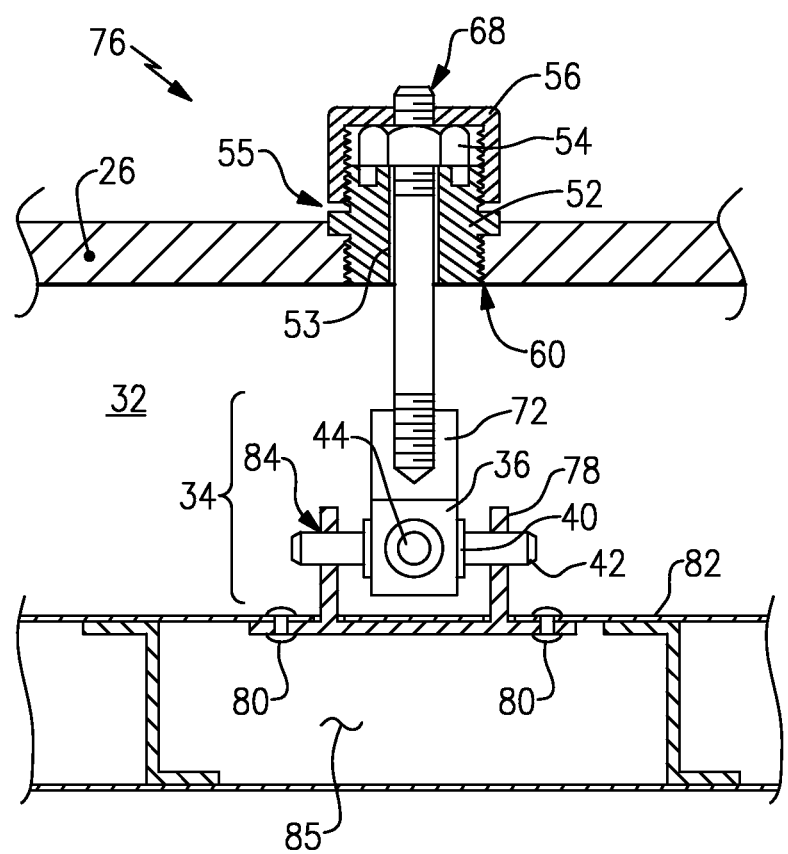
FIG. 6 is a schematic view of another hanger assembly.

Referring to FIG. 6, another example hanger assembly 76 includes the u-joint assembly 34 and an integrated yoke mount bracket 78. In this example, the liner 82 comprises a sheet metal structure defining cavity 85. The yoke mount bracket 78 is attached to the liner 82 by way of fasteners 80. In this example, the fasteners 80 comprise rivets that fasten the yoke mount 78 to the liner 82. In this way, the yoke mount 78 defines the orientation of the u-joint assembly 34. The yoke mount 78 includes openings 84 that receive the first set of pins 44 of the pivot block 40.

The first yoke 36 is as shown in the previous disclosed embodiments and includes the boss 72 that receives the threaded member 50. The threaded member 50 then extends upward through the case 26 and a bushing 52 that is disposed within the opening 60. The threaded member 50 is then secured by way of a nut 54 down onto the bushing 52 that define the spacing 32 between the case 26 and the liner 82 along with local assembly tolerances. The cap 56 is attached by way of threads to the bushing 52 to maintain the locknut 54 in interfacing contact with the bushing 52. The gap 55 between the bushing and the cap 56 ensures that the cap 56 seats on the locknut 54 and in turn holds the locknut 54 against the bushing 52.

Referring to FIGS. 7A-7C, a method of installing the example hanger assembly 30 includes an initial step of securing the mount yoke 78 to the liner 82. In this condition, the yoke assembly 34 is such that the first yoke 36 is not orientated toward the opening 60 in the case 26. Accordingly, a tool 94 that includes a hook or other feature is extended through an opening 60 within the case 26. As appreciated, the initial step is conducted prior to positioning the liner 82 within the case 26. Once all of the hanger assemblies 30 are attached to the liner 82, the liner 24 is positioned within the case 26 such that each hanger assembly 30 aligns with the corresponding opening 60 within the case 26.

Referring to FIG. 7A, the tool 94 is then inserted through the opening 60 to grab a portion of the u-joint 34 which is in this embodiment the first yoke 36 and pull the first yoke 36 upright into alignment with the opening 60.

Referring to FIG. 7B, the first yoke 36 is aligned with the opening 60. The threaded member 50 is inserted through the opening 60 and threaded into the boss 72 of the first yoke 36. A tool 96 can be used to engage a tool interface 70 at an end 68 of the threaded member 50. In this example, the tool 96 is a hex wrench and the interface 70 comprises a hex opening that corresponds with the tool 96. The tool 96 is used to tighten the threaded member 50 into the boss of the first yoke 36. The tool 94 can be utilized to maintain alignment of the first yoke 36 until such time as the threaded member 50 is secured within the first yoke 36.

Referring to FIG. 7C, once the threaded member 50 is secured to the first yoke 36 the threaded member 50 can be aligned within the opening 60 into a generally central location.

Figure 7F:
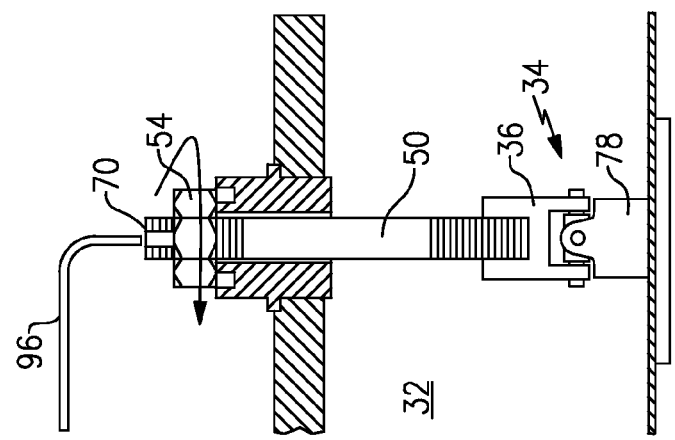
Figure 7E:
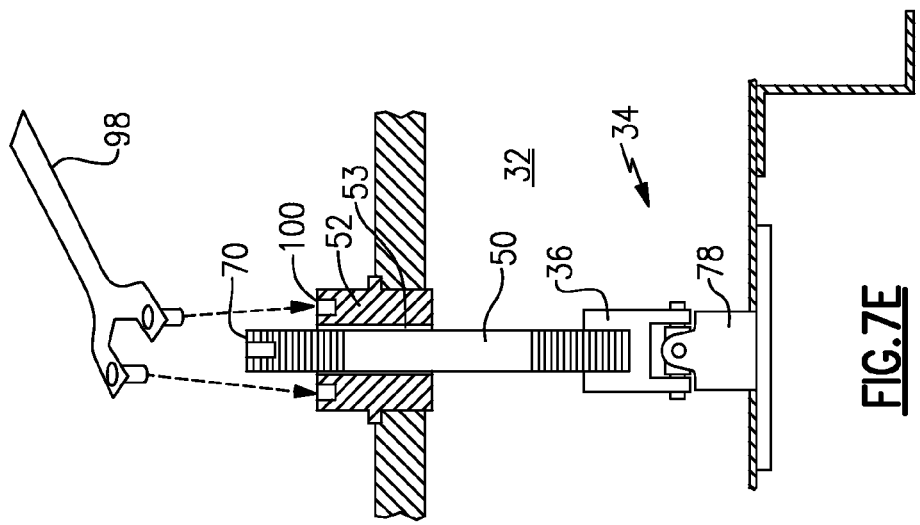
Figure 7D:
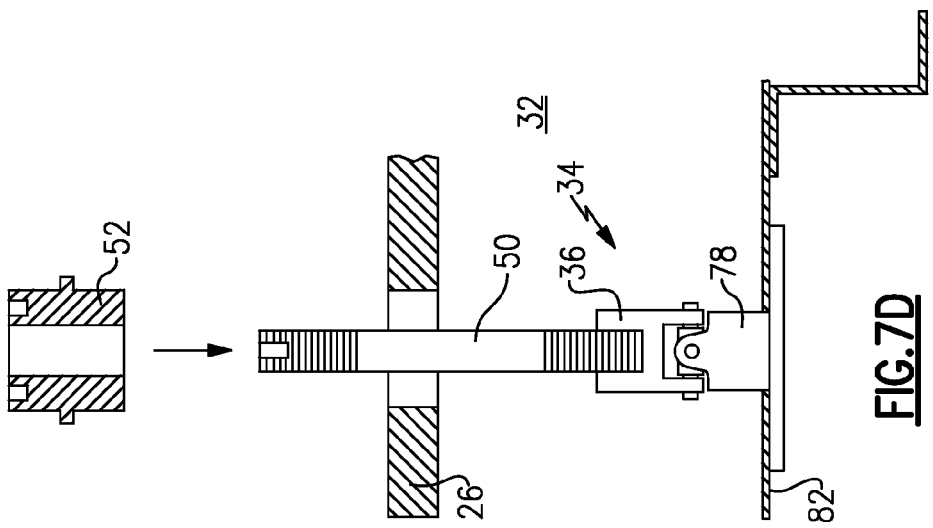

Referring to FIG. 7D, once the threaded member 50 is generally aligned within the opening 60, a bushing 52 is inserted over the threaded member 50 and threaded into the opening 60 provided in the case 26.

Referring to FIG. 7E, the bushing 52 includes tool interfaces 100 that provide for the engagement and use of a tool such as a spanner wrench 98. In this example, the tool interface 100 comprises two spaced apart openings that are engaged by a spanner wrench 98. The bushing 52 is tightened down onto the case 26 and defines the bore 50 through which the threaded member 50 extends.

Referring to FIG. 7F, once the bushing 52 is secured in place the nut 54 is secured onto the end of the threaded member 50. The tool 96 can be inserted into the tool interface 70 of the threaded member 50 to maintain the threaded member in an orientation that allows for tightening of the nut 54.

Figure 7H:
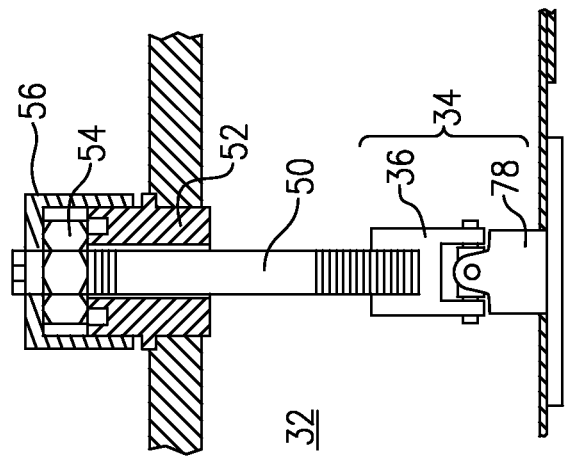
Figure 7G:
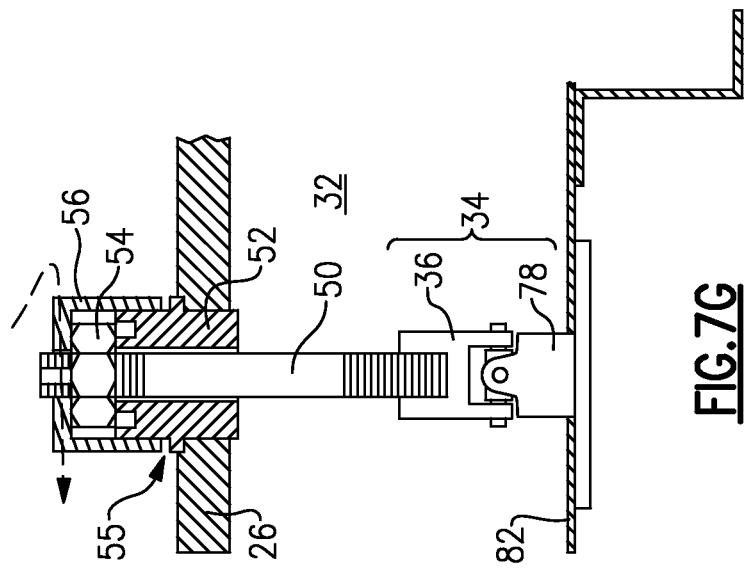

Referring to FIG. 7G, the nut 54 is turned until it is lightly seated on bushing 52. This adjusts the effective length of the hanger to the local height between case 26 and liner 24 due to part tolerances at the particular location. If it is desired to pre-tension the hanger with an initial load, additional fractional turns of the nut 54 will induce the desired load.

The cap 56 is attached to the bushing 52 over the nut 54 to prevent movement of the threaded member 50 out along the axis A relative to the case 26. By fixing the nut 54 or trapping the nut 54 between the cap 56 and the bushing 52, movement along the axis A of the threaded member 50 is prevented.

Referring to FIG. 7H, the completed assembly is shown and provides for movement of the u-joint assembly 34 that in turn provides the desired compliance and movement between the case 26 and the liner 82. As appreciated, the u-joint assembly 34 provides for movement along the axis A along with the axes 88 and 90 defined by the first and second pin sets.

It should be understood that the example assembly method is disclosed utilizing the sheet metal liner configuration 82, but also applies to other liner configurations, such as the disclosed iso-grid liner 24 shown in FIG. 2. Moreover, additional liner configurations are within the contemplation of this disclosure and would benefit from this disclosure.

Accordingly, the example hanger assembly provides for the accommodation of relative motion between the case 26 and the plurality of heat shields and liners that are suspended within the exhaust case. The example hanger assembly utilizes a u-joint mechanism that provides pivoting interfaces and a sliding yoke pair to accommodate movement in three planes between the case 26 and the liner 24.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A hanger assembly for a gas turbine engine nozzle liner comprising:
   a first mount for attachment to a case;
   a second mount for attachment to the gas turbine engine nozzle liner;
   a first yoke attached to the first mount;
   a second yoke attached to the second mount and aligned transverse to the first yoke;
   a pivot block including a first set of pins received by the first yoke and a second set of pins received by the second yoke,
   wherein the first mount includes a bushing received within an opening of the case and a first threaded member extending through the bushing that is attached to the first yoke; and
   a nut attached to the first threaded member and a cap attached to the bushing and over the nut.

2. A hanger assembly for a gas turbine engine nozzle liner comprising:
   a first mount attached to a case;
   a second mount attached to the gas turbine engine nozzle liner;

a u-joint including a pivot block movably supported between a first yoke attached to the first mount and a second yoke attached to the second mount, wherein each of the first yoke and the second yoke are U-shaped and the pivot block includes a first set of pins received by the first yoke and a second set of pins received by the second yoke, wherein the first set of pins is disposed transverse to the second set of pins and both the first set of pins and the second set of pins extend outwardly such that a longitudinal axis of the first set of pins and a longitudinal axis of the second set of pins are disposed within a common plane.

3. The hanger assembly as recited in claim 2, wherein each of the first yoke and the second yoke include openings receiving corresponding pins of the first set of pins and the second set of pins, respectively.

4. The hanger assembly as recited in claim 2, wherein the first yoke is movable in three planes relative to the second yoke.

5. The hanger assembly as recited in claim 2, wherein the first mount includes a bushing received within an opening of the case and a first threaded member extending through the bushing that is attached to the first yoke.

6. The hanger assembly as recited in claim 1, wherein the second mount includes a threaded member attached to the second yoke and to the gas turbine engine nozzle liner.

7. The hanger assembly as recited in claim 2, wherein each of the first yoke and the second yoke include respective openings for corresponding pins of the first set of pins and the second set of pins with the respective openings defining clearance fits with the first and second sets of pins.

8. An exhaust nozzle assembly comprising:
an exhaust case defining an interior space;
a liner spaced apart from the exhaust case within the interior space defining a passage for exhaust gases;
a plurality of hangers supporting the liner relative to the exhaust case, each of the plurality of hangers including a first mount attached to the exhaust case, a second mount attached to the liner, and a u-joint including a pivot block movably supported between a first yoke attached to the first mount and a second yoke attached to the second mount, wherein each of the first yoke and the second yoke are U-shaped and wherein the pivot block includes a first set of pins received within the first yoke and a second set of pins received within the second yoke transverse to the first set of pins and both the first set of pins and the second set of pins extend outwardly such that a longitudinal axis of the first set of pins and a longitudinal axis of the second set of pins are disposed within a common plane.

9. The exhaust nozzle assembly as recited in claim 8, wherein each of the first yoke and the second yoke include respective openings for corresponding pins of the first set of pins and the second set of pins with the respective openings defining clearance fits with the first and second sets of pins.

10. The exhaust nozzle assembly as recited in claim 8, wherein the first mount includes a bushing received within the exhaust case, the bushing defining a clearance opening for a first threaded member attached to the first yoke and a nut attached to an end of the first threaded member.

11. The exhaust nozzle assembly as recited in claim 8, wherein the second mount comprises a second threaded member attached to the liner.

12. The exhaust nozzle assembly as recited in claim 8, wherein the second yoke comprises the second mount and is attached to the liner.

13. An exhaust nozzle assembly comprising:
an exhaust case defining an interior space;
a liner spaced apart from the exhaust case within the interior space defining a passage for exhaust gases;
a plurality of hangers supporting the liner relative to the exhaust case, each of the plurality of hangers including a first mount attached to the exhaust case, a second mount attached to the liner, a pivot block movably supported between a first yoke attached to the first mount and a second yoke attached to the second mount, wherein the first mount includes a bushing received within the exhaust case, the bushing defining a clearance opening for a first threaded member attached to the first yoke and a nut attached to an end of the first threaded member; and a cap is attached to the bushing that covers the nut and the threaded member for constraining movement of the first threaded member through the bushing.

* * * * *